(12) United States Patent
Brooksby et al.

(10) Patent No.: US 7,583,286 B2
(45) Date of Patent: Sep. 1, 2009

(54) SYSTEM AND METHOD FOR COLLECTION AND REDISTRIBUTION OF VIDEO CONFERENCES

(75) Inventors: Scot Lorin Brooksby, Highland, UT (US); Michael Drew Flathers, Alpine, UT (US); Edward Franz Armstrong, American Fork, UT (US); Eugene Russell Christensen, Bear River City, UT (US); Glenn Daniel Clapp, Highland, UT (US)

(73) Assignee: Sorenson Media, Inc., Salt Lake City, UT (US)

( * ) Notice: Subject to any disclaimer, the term of this patent is extended or adjusted under 35 U.S.C. 154(b) by 816 days.

(21) Appl. No.: 10/831,430

(22) Filed: Apr. 23, 2004

(65) Prior Publication Data

US 2005/0237379 A1    Oct. 27, 2005

(51) Int. Cl.
*H04N 7/14* (2006.01)

(52) U.S. Cl. .................. 348/14.01; 725/106; 725/135; 725/110; 379/90.01; 379/52

(58) Field of Classification Search ..... 348/14.1–14.16; 379/90.01, 201.01, 202, 266, 162, 393, 14.13, 379/52; 725/106, 135, 110, 109
See application file for complete search history.

(56) References Cited

U.S. PATENT DOCUMENTS

| | | |
|---|---|---|
| 5,163,081 A | 11/1992 | Wycherley et al. |
| 5,333,133 A | 7/1994 | Andrews et al. |
| 5,533,108 A | 7/1996 | Harris et al. |
| 5,787,148 A | 7/1998 | August |
| 5,926,539 A | 7/1999 | Shtivelman |
| 5,982,853 A | 11/1999 | Liebermann |
| 6,031,905 A | 2/2000 | Furman et al. |
| 6,046,762 A * | 4/2000 | Sonesh et al. ............ 348/14.11 |
| 6,249,681 B1 | 6/2001 | Virtanen |
| 6,389,132 B1 | 5/2002 | Price |
| 6,477,239 B1 | 11/2002 | Ohki et al. |
| 6,570,963 B1 * | 5/2003 | Watson et al. ............ 348/14.08 |
| 6,683,937 B1 * | 1/2004 | Watson et al. .................. 379/52 |
| 6,694,008 B1 | 2/2004 | Mukherji et al. |
| 6,831,974 B1 * | 12/2004 | Watson et al. .......... 379/265.02 |
| 6,853,719 B2 * | 2/2005 | McCormack et al. .. 379/201.01 |
| 2002/0077128 A1 | 6/2002 | Okun et al. |
| 2002/0169834 A1 * | 11/2002 | Miloslavsky et al. ........ 709/206 |
| 2003/0112927 A1 * | 6/2003 | Brown et al. ........... 379/114.13 |

(Continued)

FOREIGN PATENT DOCUMENTS

EP    0 821 510 A2    1/1998

(Continued)

*Primary Examiner*—Curtis Kuntz
*Assistant Examiner*—Maria El-Zoobi
(74) *Attorney, Agent, or Firm*—TraskBritt

(57) ABSTRACT

A method and system for distributing video calls includes receiving a plurality of incoming video calls originating from a corresponding plurality of calling endpoints over a data network. A corresponding plurality of first connections is formed with each of the plurality calling endpoints. Data is streamed over the plurality of first connections while the plurality of calling endpoints awaits availability of one answering endpoint. A second connection is then formed between one of the plurality of calling endpoints and the one answering endpoint to replace one of the plurality of first connections when the one answering endpoint is available.

20 Claims, 4 Drawing Sheets

U.S. PATENT DOCUMENTS

2004/0150712 A1* 8/2004 Le Pennec .............. 348/14.02
2004/0169834 A1* 9/2004 Richter et al. ............. 355/67
2005/0086699 A1* 4/2005 Hahn et al. ............... 725/106

FOREIGN PATENT DOCUMENTS

EP   0 848 552 A1   6/1998
WO   WO 99/14951    3/1999

* cited by examiner

SYSTEM AND METHOD FOR COLLECTION AND REDISTRIBUTION OF VIDEO CONFERENCES

BACKGROUND OF THE INVENTION

1. Field of the Invention

The present invention relates to telecommunication services which utilize video telephony. More particularly, the invention relates to the buffering or holding of video calls, in a networked environment.

2. State of the Art

In order to provide a more interactive experience, video telephony, also known herein as video conferencing, has become popular. It is commonplace for a plurality of video phones to call into a collection point which then couples all of the video phones together into a conferencing session by forming a bridge between the various video conferencing devices. However, video telephony is becoming more popular for use between a single calling party or endpoint and a single answering party or endpoint. Additionally, various applications of such point-to-point video conferencing are in practice.

One such application for point-to-point video conferencing relates to communication with hearing-impaired users who are generally highly efficient at visual communications through the use of, for example, sign language. Furthermore, systems for facilitating such communication between a hearing-impaired user and a hearing-capable user are becoming more commonplace due to various mandates. For example, under the guidance of Title IV of the Americans with Disabilities Act of 1990, telecommunication services were mandated to provide hearing and speech impaired parties with functional equivalents of the telecommunication services afforded hearing and speech-capable parties. Accordingly, various approaches were implemented with one being a Video Relay Service (VRS). The VRS was developed to allow hearing-impaired users to converse in sign language over an imaging device with a hearing-capable user that utilizes standard telecommunication services, such as the Internet and Public Switched Telephone Network (PSTN).

Various implementations of establishing a communication session between a hearing-impaired party and a hearing-capable party have been proposed and implemented. Because such telecommunication services utilize resource-limited interpretive services, the incoming calls from, for example, hearing-impaired users may undergo a delay process in order to await the availability of such interpretive services. Therefore, there is a need to provide such video telephony participants with a waiting or hold environment that is informative and intuitive in form and structure.

BRIEF SUMMARY OF THE INVENTION

The present invention is directed to a system and method for collection and redistribution of video calls. In one embodiment of the present invention, a system is provided for distributing video calls. The system includes a video relay service comprising logic configured to receive a plurality of video calls originating from a corresponding plurality of video phones over a data network. The video relay system is further configured to form a corresponding plurality of first connections with each of the plurality of calling endpoints. The video relay service is further configured to maintain the plurality of video calls on hold and in a priority and to forward one of the plurality of video calls having priority to form a second connection. The system further includes at least one answering endpoint coupled to the video relay service via the data network. The at least one answering endpoint is configured to update the video relay service when the at least one answering endpoint is available for connection with one of the plurality of video phones corresponding to one of the plurality of video calls on hold. The second connection being formed directly between the at least one of the plurality of video calls and the at least one answering endpoint.

In another embodiment of the present invention, a method for distributing video calls is provided. A plurality of incoming video calls is received originating from a corresponding plurality of calling endpoints over a data network. A corresponding plurality of first connections is formed with each of the plurality calling endpoints. Data is streamed over the plurality of first connections while the plurality of calling endpoints await availability of one answering endpoint. A second connection is then formed between one of the plurality of calling endpoints and the one answering endpoint to replace one of the plurality of first connections when the one answering point is available.

In yet a further embodiment of the present invention, a communication system for coupling hearing-impaired users with an interpreter is provided. The system includes a plurality of calling video phones is configured to couple the corresponding plurality of hearing-impaired users over a network to a single network address. The system further includes a video relay service configured to couple over a network and addressable by the single network address. The video relay service configured to receive a plurality of video calls originating from a corresponding plurality of calling video phones and to form a corresponding plurality of first connections with each of the plurality of calling video phones and to maintain the plurality of video calls on hold and in a priority and to forward one of the plurality of video calls having priority to form a second connection. The system additionally comprises an answering video phone configured to couple an interpreter over the network to one of the plurality of calling video phones. The answering video phone being configured to update the video relay service when the at least one answering video phone is available for connection with one of the plurality of calling video phones corresponding to the one of the plurality of video calls on hold. The second connection is formed directly between the one of the plurality of calling video phones and the at least one answering video phone.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
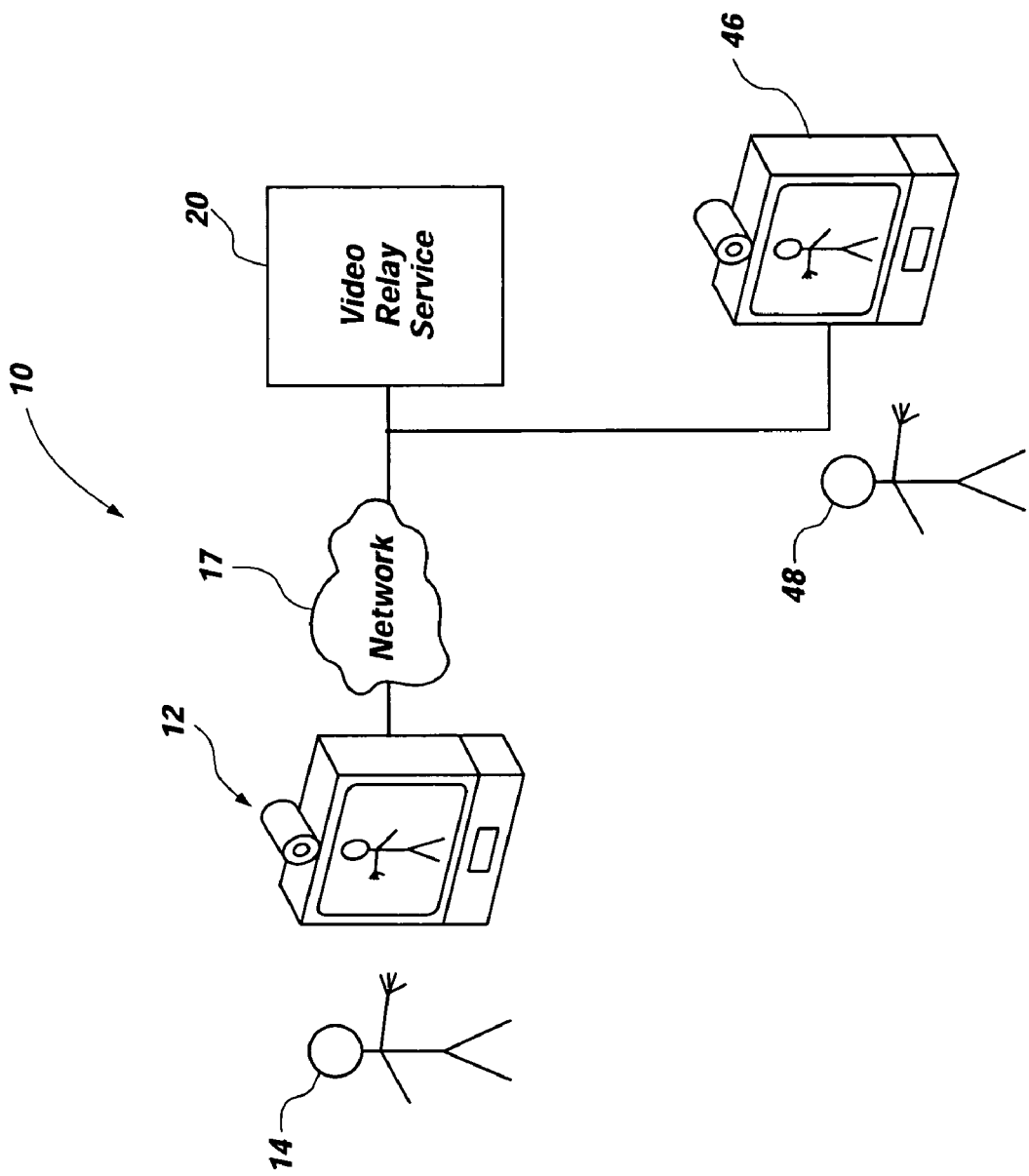
FIG. 1 illustrates a communication system, in accordance with an embodiment of the present invention.

FIG. 1 illustrates a communication system configured to facilitate a video communication session between a first video phone user 14 and a second video phone user 48, in accordance with an embodiment of the present invention. While the present invention facilitates a connection between a first and second video phone user, a specific example is illustrated herein wherein the first video phone user 14 may be considered, by way of example and not limitation, as a hearing-impaired user finding communicative advantages by interfacing with a video phone. Furthermore, the image-based communication session couples the first video phone user 14 with a second video phone user 48, and according to the specific example herein, may assume the form of an interpreter who also engages in an imaging-based conversation with a first video phone user 14, illustrated herein as a hearing-impaired user. It is reiterated that while the specific example illustrated herein utilizes a hearing-impaired environment, the invention and the various embodiments described find broad application to video telephony in general.

Returning to the specific example, a communication system 10 enables a first video phone user 14, such as a hearing-impaired user, to engage in conversation through a communication system with a second video phone user 48, an example of which may be an interpreter using image based communications. A communication session between the users is facilitated through the use of various equipments which are preferably coupled together using various networks selected and configured to provide adequate bandwidth for the exchange of video data.

By way of example and not limitation, the video-based communication system 10 conveys video-based communicative expressions with user 14 within communication system 10 by incorporating a calling video phone 12 for capturing and displaying the communicative expressions exhibited by first video phone user 14 and for displaying communicative expressions originating with second video phone user 48. While the specific substance of the expressions may vary widely, one such acceptable expression for use in the current hearing-impaired example includes sign language and/or body language which may be interpreted or translated by second video phone user 48 using an answering video phone 46 when the connection is established between users 14 and 48 as determined and controlled by video relay service 20. Furthermore, the various devices, such as calling video phone 12 and answering video phone 46 are coupled to video relay service 20 using a network 17.

Figure 2:
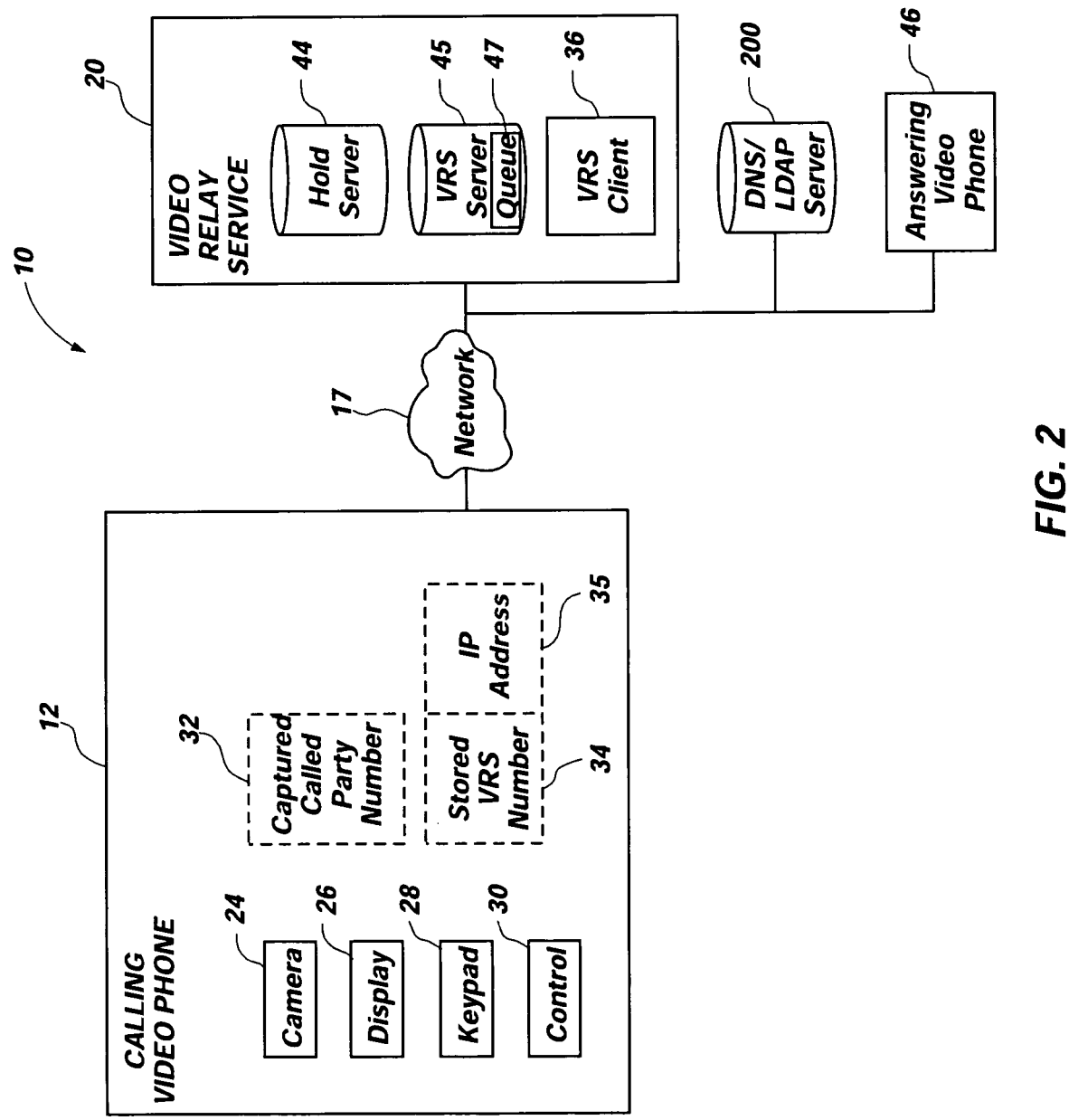
FIG. 2 illustrates a simplified block diagram of a communication system, in accordance with an embodiment of the present invention.

FIG. 2 is a simplified diagram of a communication system 10, in accordance with an embodiment of the present invention. To facilitate the interaction between users, a calling video phone 12 and an answering video phone 46 include video components such as a camera 24 for capturing the communicative expression and further includes a display or monitor 26 for displaying the communicative expressions exchanged between the users. Video phones 12 and 46, in accordance with an embodiment of the present invention, further include a keypad 28 or other data entry device configured to enable a user to initiate a communication session in a conventional manner by entering, for example, a telephone number of the answering user, which is known herein as a called party telephone number and which is further captured and stored. In accordance with one embodiment of the present invention, the calling user is able to interact with calling video phone 12 to initiate a phone call in a manner consistent with the interaction of a user initiating a phone call over a conventional voice-based telephone network. Specifically, a first or call-initiating user enters a called party number 32 using an input device such as keypad 28. The called party number 32 is captured by control process 30 and stored as a captured called party number 32.

Control process 30 retrieves a stored VRS number 34 which identifies a specific video relay service and using a protocol, such as DNS or LDAP protocol, contacts DNS or an LDAP server 200 and passes thereto a domain name or stored VRS number 34 and requests therefrom a corresponding IP address 35. Calling video phone 12 thereafter initiates a call to video relay service 20 over network 17 using, for example, IP address 35 as returned from LDAP server 200.

In accordance with one embodiment of the present invention, control process 30 initiates a communication session over network 17 between calling video phone 12 and video relay service 20. The communication session between calling video phone 12 and video relay service 20 is more specifically initially connected to a hold server 44 within video relay service 20. Hold server 44 communicates with a VRS server 45 and when hold server 44 receives an incoming call in the form of a call request for the establishment of a communication session between calling video phone 12 and answering video phone 46, hold server 44 notifies VRS server 45 of the intention to establish a communication session between calling video phone 12 and answering video phone 46. During the establishment of the communication session between calling video phone 12 and video relay service 20, calling video phone 12 passes a call request including call information to hold server 44. The call request is subsequently passed to VRS server 45 including the call information which includes various information including the captured called party number 32. VRS server 45 includes and maintains a call queue 47 for one or more calls originating from one or more calling video phones 12 seeking to establish and maintain a communication session with an answering video phone 46.

Figure 3:
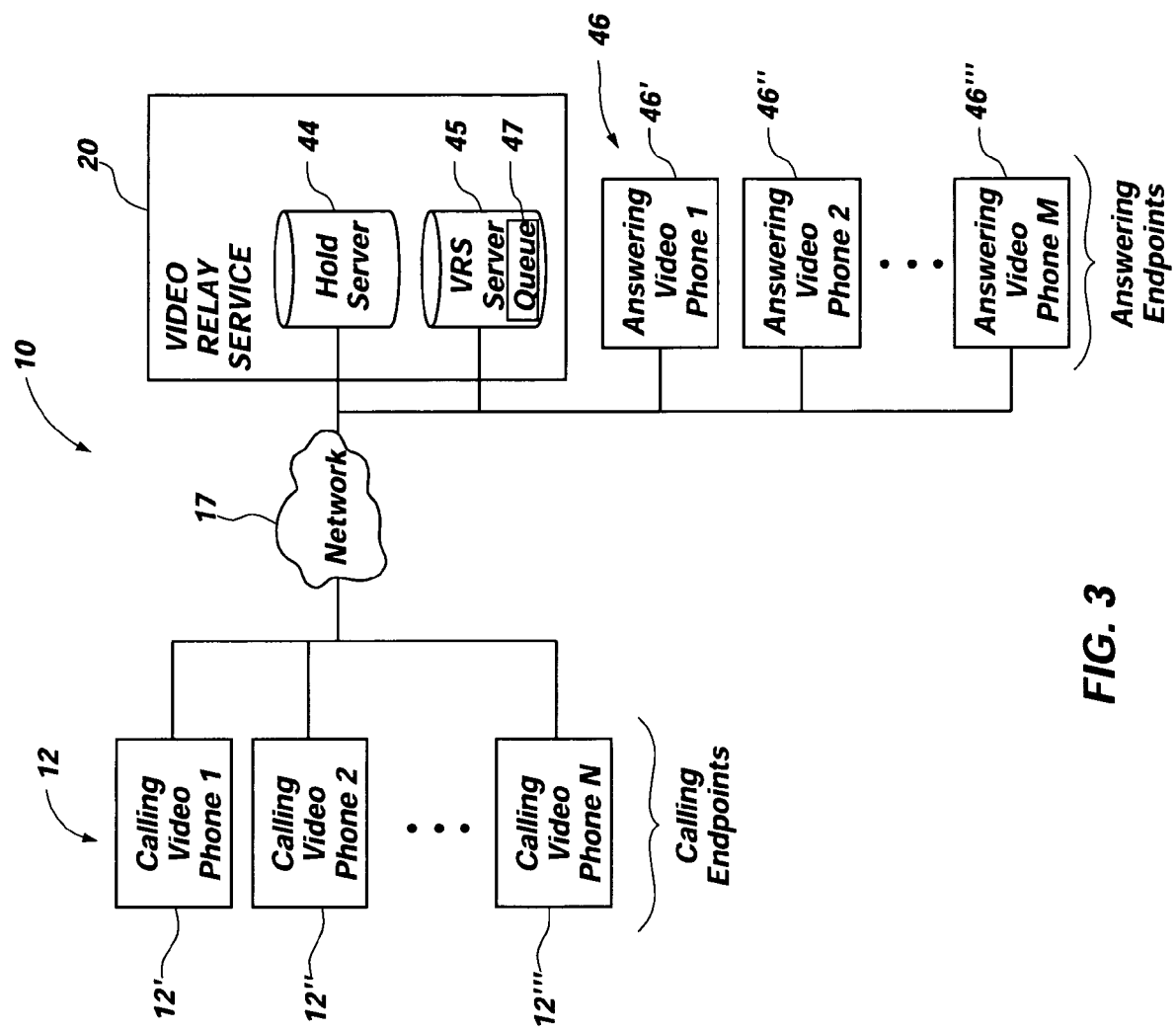
FIG. 3 illustrates a network diagram of a communication system, in accordance with an embodiment of the present invention.

FIG. 3 is a block diagram of a network for connecting one or more calling endpoints with one or more respective answering endpoints, in accordance with an embodiment of the present invention. The illustrated system 10 collects and distributes video communication sessions in applications or environments where there are more incoming video calls than can be handled by the answering endpoints. System 10 is further configured to allow for a single point of contact, namely video relay service 20 for all incoming calls. Video relay service 20 further determines the timely routing of the incoming calls to respectively available answering video phones, in accordance with the various embodiments of the present invention. Each of the calling video phones 12 (individually identified, in block diagram form, as calling video phones 12', 12" and 12'") or calling endpoints that attempts to connect within the system is effectively placed "on hold" by video relay service 20, and more particularly serviced by hold server 44. While each of the calling endpoints or calling video phones 12 are in a hold status, hold server 44 presents audio and/or video that indicates the status of the call while on hold. When an answering endpoint or answering video phone 46 (individually identified as answering video phones 46', 46", and 46'") becomes available, an example of which is the availability of interpreter services in a hearing-impaired example, VRS server 45 informs hold server 44 to instruct the call to be transferred to the respective available answering endpoint or answering video phone 46. Thereupon, video relay service 20, while optionally maintaining status on the call such as in a metering or billing application, becomes exclusive to the communication session. Therefore, according to the various embodiments of the present invention, all incoming calls may be answered, even if respective available answering endpoints are unavailable.

As stated, system 10 receives and services all incoming calls by employing, for example, a protocol stack within a hold server 44 to establish a video conferencing session with each of the incoming calls. After each of the sessions is initialized, audio and/or video channels are negotiated with the calling endpoints and hold server 44 begins streaming audio/video data through the negotiated channels. Different audio and video data may be streamed to differing endpoints based on various factors, such as available bandwidth, calling endpoint type, estimated hold time, etc. When it is determined that an answering endpoint has become available, the call is transferred to the answering endpoint using a transfer mechanism that is supported by the calling endpoint. There is also capability within system 10 via, for example, an unpublished API (not shown) to monitor and control hold server 44. Such a capability includes notification to VRS server 45 of new calls received while VRS server 45, acting as the controlling entity, notifies hold server 44 when it is appropriate to transfer calls to the answering endpoints.

In one embodiment of the present invention, system 10 may be implemented as the "call center" where users are able to call into the call center with a video conferencing calling endpoint and receive a similar type experience available to standard voice phone services, namely, that the incoming calls may be placed on hold and maintained in some form of priority while receiving feedback on the status of their call while awaiting the availability of answering endpoints. Therefore, system 10 employs a method configured to answer all incoming calls rather than rejecting calls when answering endpoints are busy or otherwise unavailable. System 10 further allows incoming calls to be placed in a direct point-to-point manner rather than requiring all callers to register with a gatekeeper to place the call. While calls are "on hold" at hold server 44, audio and/or video may be streamed to the calling endpoint to provide reassurance and status information.

Figure 4:
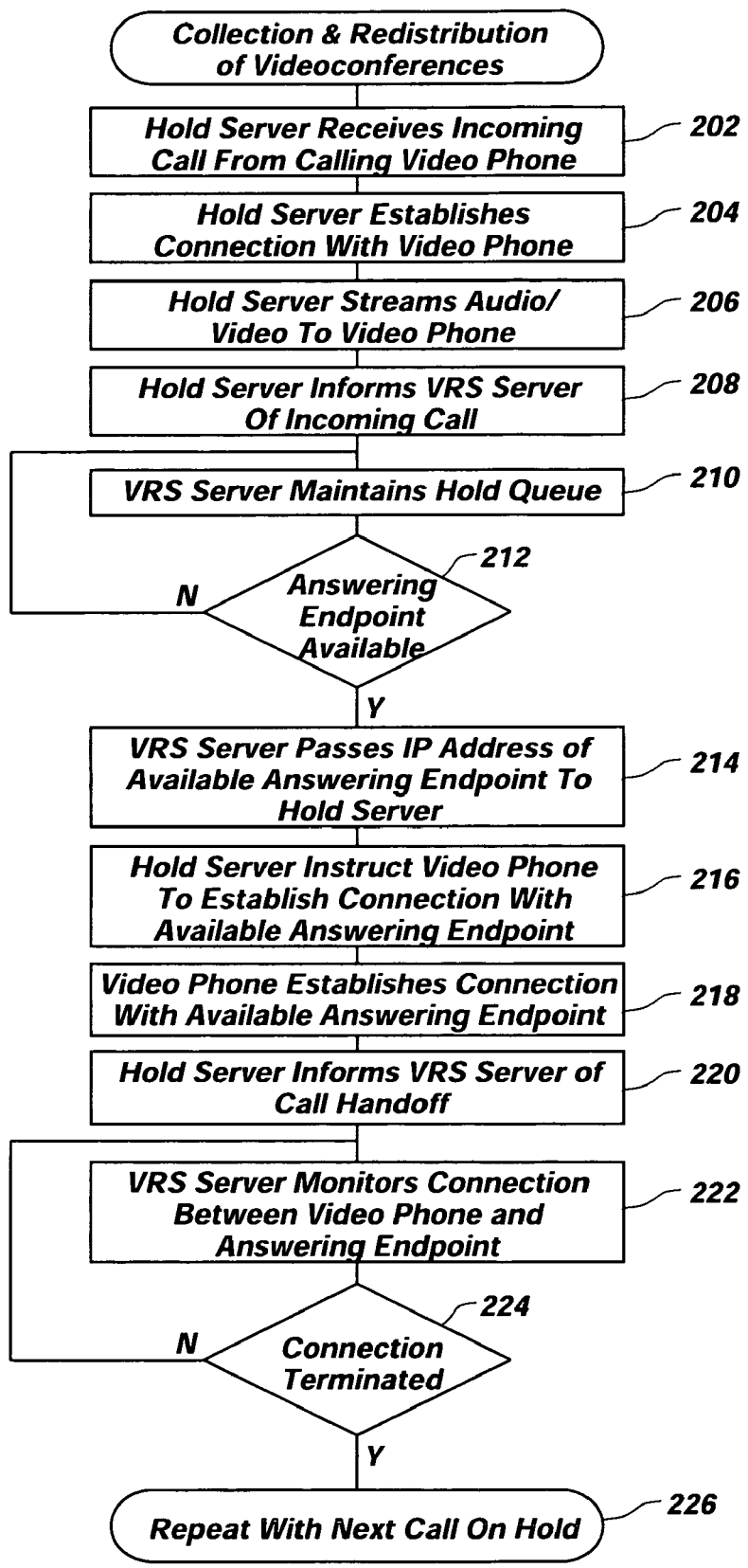
FIG. 4 is a flow diagram of a method for collection and redistribution of video calls, in accordance with an embodiment of the present invention.

FIG. 4 is a flow chart illustrating a method for the collection and redistribution of video conferences, in accordance with an embodiment of the present invention. Although the specific example as illustrated herein utilizes one particular protocol, the invention as defined and described is not so limited. While the present invention finds application to video conferencing generally, the one or more embodiments of the present invention finds particular application to environments where a multiplicity of calling endpoints or calling video phones are seeking access to services which may be more limited in their availability, such as those provided by answering endpoints or answering video phones. As stated, the present example utilizes an H.323 protocol which is a video conferencing protocol, the specifics of which are known by those of ordinary skill in the art.

The calling video phone 12 (FIG. 3), utilizing an IP address previously obtained as described above, issues a call request stating its intent to place a call over, for example, port 1720 to hold server 44 (FIG. 3) in a step 202. A step 204 establishes a response to the incoming request and further establishes a connection with video phone 12. In step 206, an exchange capabilities is negotiated between the two endpoints to the communication session, namely video phone 12 and hold server 44. Such a negotiation may contain an exchange of capabilities such as the audio and video capability of each of the endpoints. The negotiation ends with a resolution of commonalities of capabilities for use in establishing a conference therebetween. Hold server 44 (FIG. 3), based upon the negotiated capabilities, begins streaming audio and/or video information to calling video phone 12.

In step 208, the hold server 44 (FIG. 3) informs the VRS server 45 (FIG. 3) that a request has been received and a connection between hold server 44 and calling video phone 12 has been established and that calling video phone 12 is requesting a connection with answering endpoint, such as answering video phone 46 (FIG. 3). In one implementation, the aforementioned information is passed over IP network 17 using a continuously established connection between VRS server 45 and hold server 44. Such an exchange may occur using one or more protocol standards, including TCP, for exchanging information therebetween.

In step 210, VRS server 45 (FIG. 3) maintains priority of the incoming calls initiated by calling video phones 12 through the use, for example, of a call queue 47 (FIG. 3) maintained within, for example, VRS server 45. Generally, a state is maintained for each call that is received within the system which enables VRS server 45 to identify the next call which has priority and should be serviced with the next available resources available from among the answering endpoints. When an answering endpoint becomes available as identified by query step 212, VRS server 45, in step 214, notifies hold server 44 of the availability of an answering endpoint, namely, an available answering video phone 46. Such notification occurs over the previously described continuously established connection between hold server 44 and VRS server 45.

In a step 216, hold server 44 accepts the information regarding the available answering endpoint resources and utilizing, for example, a protocol enhancement available for some H.323 protocol stacks, and utilizing, for example, an API, specifies that the call should be transferred from the hold server 44 to a specific IP address, namely the IP address of the available answering endpoint. In a step 218, the calling video phone establishes the connection with the available answering video phone since the hold server 44 instructed calling video phone 12 to transfer the connection. Therefore, the connection between the calling video phone 12 and the hold server 44 is terminated and the calling video phone 12 is then directly connected to the answering video phone 46 over the IP network 17.

In a step 220, hold server 44 informs VRS server 45 of a "hand-off" through the continuously maintained connection between hold server 44 and VRS server 45. Once the transfer of the connection directly to the answering endpoint is complete, VRS server 45, at step 222, may maintain call information based on the fact that it knows the call has been transferred and may also receive additional information from the specific answering video phone to maintain status information regarding the current state of the connection and any other status information of interest, such as a projected duration of the connection between calling video phone 12 and answering video phone 46. In a step 224 the status of the connection between the calling endpoint and the answering endpoint is determined. If the connection has been terminated, the answering video phone 46 informs VRS server 45 and any status information known therein may be updated with respect to the specific terminated connection. Also, VRS server 45 becomes aware of an available resource, namely the availability of an answering endpoint for use by another call that may be on hold. The process may then be repeated 226 with the next call on hold.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A system for distributing video calls, comprising:
a video relay service comprising logic configured to receive a plurality of video calls originating in response to an entered called party number from a corresponding plurality of video phones over a data network from a corresponding plurality of calling endpoints and to form a corresponding plurality of first connections with each of the plurality of calling endpoints, the logic further configured to receive each of the entered called party numbers and maintain the plurality of video calls on hold and in a priority and to forward one of the plurality of video calls having priority including the respective one of the entered called party number to form a second connection; and
at least one answering endpoint coupled to the video relay service via the data network, the at least one answering endpoint comprising logic configured to update the video relay service when the at least one answering endpoint is available for connection with one of the plurality of video phones corresponding to the one of the plurality of video calls having priority, the second connection being formed directly between the one of the plurality of calling endpoints and the at least one answering endpoint upon the video relay service transferring a call request including the entered called party number to the at least one answering endpoint.

2. The system of claim 1, wherein the video relay service comprises a hold server configured to receive the plurality of video calls and to forward the one of the plurality of video calls to form the second connection.

3. The system of claim 2, wherein the hold server is further configured to stream data to each of the plurality of video phones while the plurality of video calls is on hold.

4. The system of claim 2, wherein the video relay service comprises a video relay service server configured to monitor the at least one answering endpoint and provide an address to the hold server of the at least one answering endpoint when the at least one answering endpoint is available.

5. The system of claim 4, wherein the video relay service server further comprises a queue for maintaining priority of the plurality of video calls.

6. The system of claim 1, wherein the plurality of first connections and the second connection are configured according to an H.323 standard.

7. A method for distributing video calls, comprising:
receiving a plurality of incoming video calls and entered called party numbers originating in response to entering the called party number from a corresponding plurality of calling endpoints over a data network;
forming a corresponding plurality of first connections with each of the plurality of calling endpoints;
storing the received called party numbers;
streaming data over the plurality of first connections while the plurality of calling endpoints await availability of one answering endpoint; and
passing a call request including a called party number to form a second connection between one of the plurality of corresponding calling endpoints and the one answering endpoint to replace one of the plurality of first connections when the one answering point is available.

8. The method of claim 7, further comprising maintaining the plurality of first connections in a queue to determine a priority for establishing the second connection.

9. The method of claim 8, further comprising following forming the second connection, updating the queue to determine another one of the plurality of first connections having priority.

10. The method of claim 7, wherein the streaming data comprises streaming data identifying the corresponding one of the plurality of first connections as being in an on hold status.

11. The method of claim 7, further comprising monitoring availability of the one answering endpoint to determine when to form the second connection.

12. The method of claim 10, further comprising passing an address of the one answering endpoint over the one of the plurality of first connections to facilitate formation of the second connection as a direct connection between the one of the plurality of corresponding calling endpoints and the one answering endpoint.

13. The method of claim 7, further comprising monitoring the second connection for a termination of the second connection to identify availability of the one answering endpoint.

14. A communication system for coupling hearing-impaired users with an interpreter, comprising:
a plurality of calling video phones configured to couple a corresponding plurality of hearing-impaired users over a network to a single network address;
a video relay service configured to couple over the network and addressable by the single network address, the video relay service configured to receive a plurality of video calls originating in response to an entered called party number from corresponding ones of the plurality of calling video phones and to form a corresponding plurality of first connections with each of the plurality of calling video phones and to receive each of the entered called party numbers and maintain the plurality of video calls on hold and in a priority and to forward one of the plurality of video calls having priority including the respective one of the entered called party number to form a second connection; and
an answering video phone configured to couple an interpreter over the network to one of the plurality of calling video phones, the answering video phone comprising logic configured to update the video relay service when the answering video phone is available for connection with one of the plurality of calling video phones corresponding to the one of the plurality of video calls having priority, the second connection being formed directly between the one of the plurality of calling video phones and the answering video phone upon the video relay service transferring a call request including the entered called party number to at least one answering endpoint.

15. The communication system of claim 14, wherein the video relay service comprises a hold server configured to receive the plurality of video calls and to forward the one of the plurality of video calls to form the second connection.

16. The communication system of claim 15, wherein the hold server is further configured to stream data to each of the plurality of calling video phones while the plurality of video calls is on hold.

17. The communication system of claim 15, wherein the video relay service comprises a video relay service server configured to monitor the answering video phone and provide an address to the hold server of the answering video phone when the answering video phone is available.

18. The communication system of claim 17, wherein the video relay service server further comprises a queue for maintaining priority of the plurality of video calls.

19. The communication system of claim 14, wherein the corresponding plurality of first connections and the second connection are configured according to an H.323 standard.

20. The communication system of claim 14, further comprising a second answering video phone configured in the manner of the answering video phone, the second answering video phone and the answering video phone configured for alternative coupling with the one of the plurality of calling video phones.

* * * * *

UNITED STATES PATENT AND TRADEMARK OFFICE
CERTIFICATE OF CORRECTION

PATENT NO. : 7,583,286 B2  Page 1 of 1
APPLICATION NO. : 10/831430
DATED : September 1, 2009
INVENTOR(S) : Brooksby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Fourteenth Day of December, 2010

David J. Kappos
*Director of the United States Patent and Trademark Office*